Oct. 21, 1958 — M. U. MORRIS ET AL — 2,857,135
FLUID DRIVE MOTOR

Filed Jan. 9, 1957 — 3 Sheets—Sheet 1

INVENTORS—
MERCHANT U. MORRIS &
ROBERT W. VEHLING
By- Herbert A. Minturn
ATTORNEY

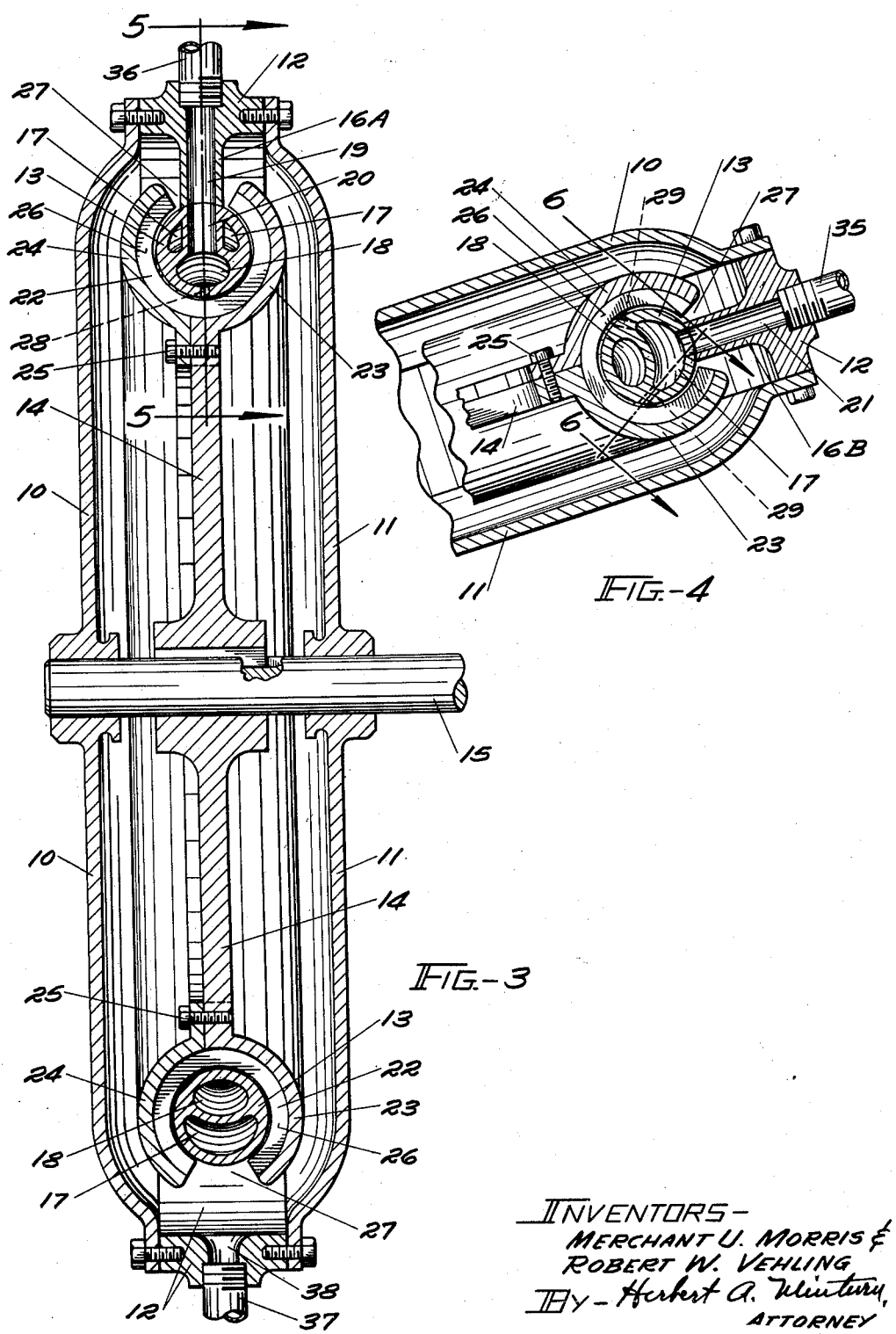

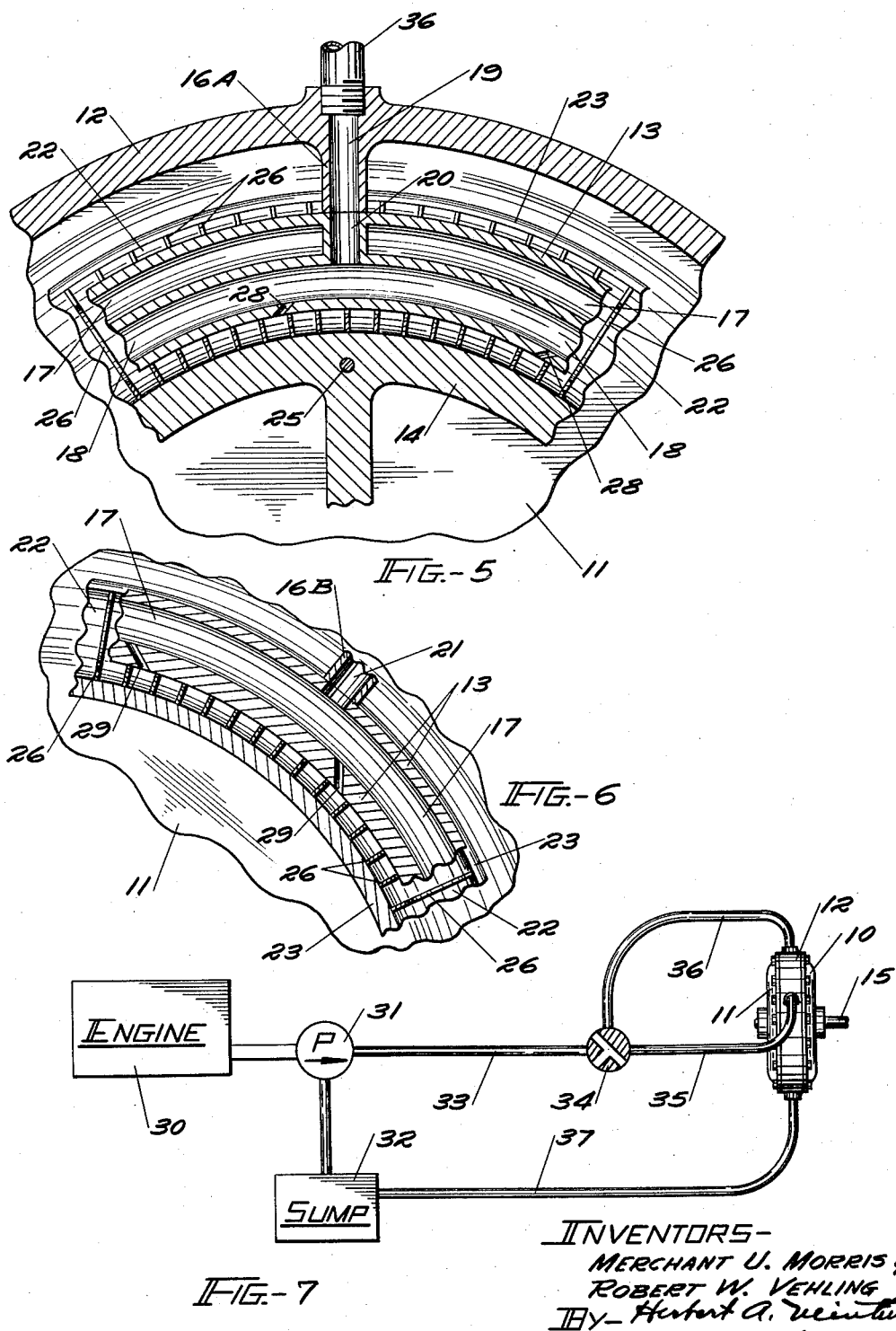

United States Patent Office 2,857,135
Patented Oct. 21, 1958

2,857,135

FLUID DRIVE MOTOR

Merchant U. Morris and Robert W. Vehling, Indianapolis, Ind., assignors of 16⅔ percent to Robert D. Boone, 26⅔ percent to Ernest W. Hohlt and Herbert Hohlt, 33⅓ percent to said Morris, and 23⅓ percent to said Vehling, all of Indianapolis, Ind.

Application January 9, 1957, Serial No. 633,271

3 Claims. (Cl. 253—105)

This invention relates to a rotary type of motor designed to be driven by fluid under pressure. The invention involves the conducting of the pressurized fluid into a circular tube from which the fluid discharges through jets against vanes surrounding the tube and fixed to a rotor element.

The invention finds many uses, one for example, being in automobiles including trucks, wherein the motor may be applied in immediate proximity to a driving wheel or wheels, eliminating mechanical transmissions, differential gearing, and their attended weights. The motor also may be used interchangeably with electric motors, and in any situation where a compact unit is desired for a power source.

The invention embodies in a general sense a power source for placing fluid under pressure, and a pipe system conducting the pressurized fluid to the individual motor. The invention is primarily directed to the motor itself rather than to the system.

One particular form of the invention is herein described in reference to the accompanying drawings in which—

Fig. 3 is a section on an enlarged scale diametrically through the motor on the line 3—3 in Fig. 1;

Fig. 4 is a view in section on the line 4—4 in Fig. 1;

Fig. 5 is a view in section on the line 5—5 in Fig. 3;

Fig. 6 is a view in section on the line 6—6 in Fig. 4; and

Fig. 7 is a diagrammatic view of the entire power system.

Figure 2:
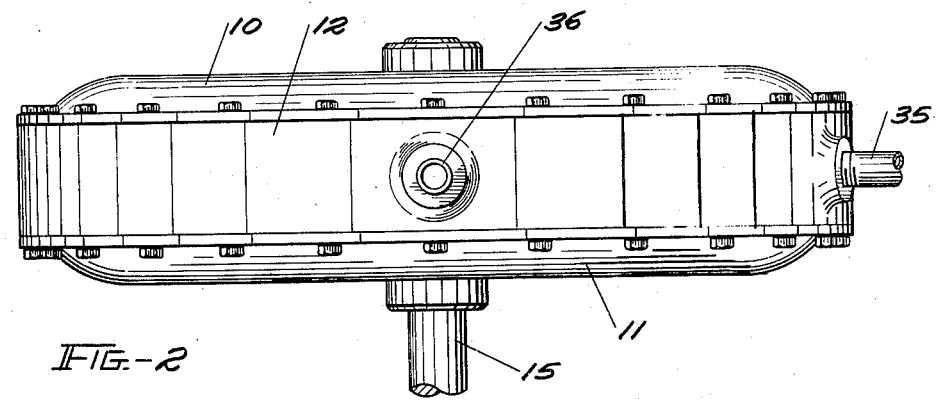
Fig. 2 is a view in top plan.
Figure 1:
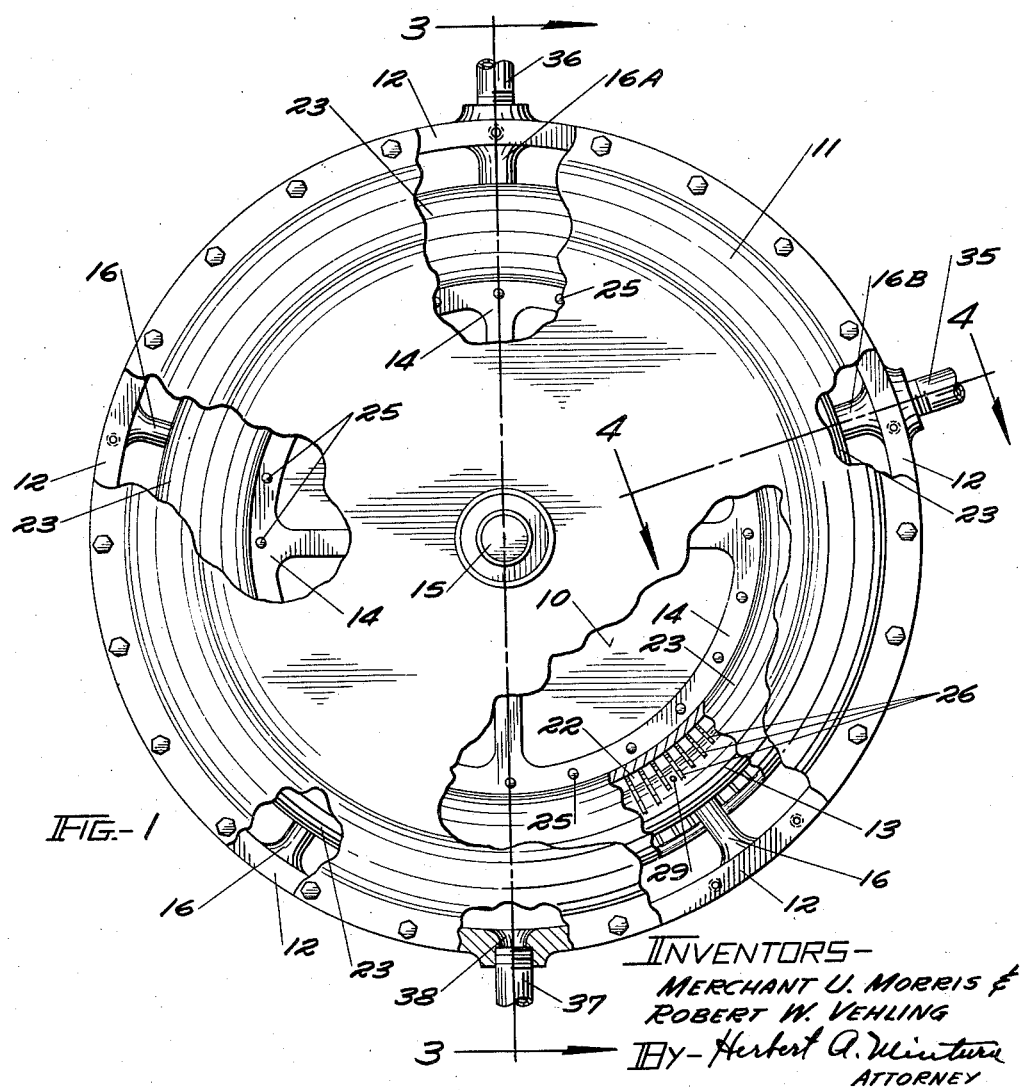
Fig. 1 is a view in side elevation and partial section of a motor embodying the invention.

The motor consists primarily of the housing enclosing elements 10 and 11 secured on opposite sides of a central annular ring 12; a fixed circular tube 13; and a rotor 14 enveloping in the main tube 13 and fixed to a driving shaft 15. The shaft 15, Fig. 3, is herein shown as being rotatably supported by the housing enclosing members 10 and 11.

The tube 13 is supported at intervals by posts 16 fixed to the ring 12 and also to the tubular ring 13.

One of these posts 16A is hollow to provide a passageway from outside of the central ring 12 opening into the interior of the tube ring 13. Another post 16B is also hollow and provides a passageway therethrough from the outside of the ring 12 and opening into the tube 13. The post 16A with its interior passageway constitutes an intake member through which fluid may be entered into the tube 13 for setting up travel of the rotor 14 in one direction, which for sake of convenience will be called a "forward" direction, and the post 16B with its passageway also serves to convey fluid under pressure into the tube 13 to set up a reverse direction of rotation of the rotor 14, herein, for sake of convenience, termed a "reverse" travel.

The tube 13 while having a circular cross-section in respect to its exterior surface, is divided into two separate annular passageways 17 and 18 each extending continuously around the tube 13. In the form herein illustrated, the passageway 17 is around the outermost portion in the cross-sectional view whereas the passageway 18 is around the innermost portion of the tube 13, that is the passageway 17 is at a greater radial distance from the axis of the shaft 15 than is the passageway 18. The passageway, designated by the numeral 19, in the post 16A continues through the passageway 20 radially extending across the tube 13 into the passageway 18. The passageway designated by the numeral 21 in the post 16B discharges into the passageway 17. These posts 16 hold the tube 13 in radial alignment with the axis of the shaft 15 at all times.

The rotor 14 is provided with an outer tubular chamber 22 which surrounds the tube 13 as previously indicated. This chamber 22 is defined by the approximately semi-circular wall 23 on the one side and the approximately semi-circular wall 24 on the other side. For sake of convenience in assembly, the wall 23 is an integral part of the rotor 14, whereas the wall 24 is a separate part bolted onto the rotor 14 by any suitable means such as by the cap screws 25.

Within the chamber 22 there is provided a plurality of vanes 26 which may be of any desired design such as cupped, spirally positioned, or as herein shown planar blades arranged in planes radially disposed in reference to the axis of the shaft 15. These vanes or blades 26 extend circumferentially around the walls 23 and 24 and are fixed thereto, and are co-extensive in circumferential lengths with the circumferential lengths of the walls 23 and 24. The circumferential lengths of both the walls 23, 24 and of the blades 26 are interrupted to leave a gap designated by the numeral 27 sufficient to clear the posts 16 upon rotation of the rotor 14. The radial lengths of the blades which appear between the outside of the tube 13 and the insides of the walls 23 and 24 are such that there is a fluid tight fit with those walls, and a running fit or clearance between the blades and the surface of the tube 13.

The tube 13 has a plurality of passageways 28 extending diagonally through the wall thereof on that side of the tube 13 toward the shaft 15. These passageways 28 may be termed jets, and are so directed that when fluid is fed through the passageways 19 and 20, and into the passageway 18, the fluid will impinge on the blades 26 to drive the rotor 14 in that "forward" direction. The number of these jets 28 may be selected in accordance with the volume, pressure, and viscosity of the fluid employed to give the desired power output at the shaft 15 all in accordance of course with the particular design of the individual blades 26.

Referring to Fig. 6 particularly, there is a plurality of passageways or jets 29 leading from the passageway 17 of the tube 13 in directions oppositely from those of the jets 28 whereby fluid entering the passageway 21 and flowing through the passageway 17 escapes through the jets 29 to impinge on the blades 26 to turn the rotor in the "reverse" direction. It is noted that these passageways 29 are directed to form the jets without interference as to flows from the innermost passageway 18 on the tube 13. For example, in order to simplify the formation of the tube 13, so as to avoid complications in forming the tube 13 wherein both sets of jets 28 and 29 would be centered on a diametrical center line through the rotor and tube 13, the jets 29 are disposed one on each side of the passageway 17 around the tube 13, and in so doing, these jets discharge not against the central portion of the blades 26, but to each side thereof, whereas the jets 28 discharge centrally of the blades 26, so that the flow of the fluid from the jets 28 is in equal directions circumferentially around the chamber 22 and around the blades 26. The flow from the jets 29 takes a less length of circumferential travel around the blades 26 accordingly.

Referring to Fig. 7, there is a prime source of power such as an engine 30 which operates a pump 31 to take the fluid, oil for an example, from a reservoir or sump 32 and discharge it through a supply line 33, discharge from which is controlled by a three-way valve 34. From the valve 34 there leads a pipe 35 to the "reverse" passageway 21, and a second pipe 36 which leads to the "forward" passageway 19. A return line 37 leads from the underside of the motor ring 12 to the sump 32.

In operation, the valve 34 is manipulated to interconnect the pipes 33 and 36 for a "forward" drive of the shaft 15. With this interconnection, and the engine 30 operating, oil is delivered under pressure into the annular passageway 18 from which the oil discharges under great velocity through the jets 28 to impinge on the vanes 26 and thus turn the rotor 14. Oil being discharged against the blades 26 will flow therearound in two directions, to discharge at the gap 27 and flow around primarily along the housing enclosures 10 and 11 down to the lower portion of the ring 12 where there is a passageway 38 opening into the connecting pipe 37 so that the oil may flow on out and back into the sump, the sump, for example being closed so that a vacuum could be applied to the space within the enclosing walls 10 and 11, and the ring 12 to facilitate outward flow of the exhausting oil.

The valve 34 may be manipulated to control the flow of oil to the passageway 18 in order to control the speed of rotation of the rotor 14. Then the rotor 14 may be stopped, and reversed in direction of rotation by manipulating the valve 34 to interconnect the pipe 33 with the pipe 35 for oil flow into the passageway 17 and out the jets 29 against the blades 26 for exhaust of the oil in the same manner into the space exterior of the ring 13 to drain back through the pipe 37.

While we have herein shown and described our invention in the one particular form, it is obvious that structural changes may be made without departing from the spirit of the invention, such as for example in the blade shapes, and actual structural formation of the tube 13, and the rotor element itself, and we therefore do not desire to be limited to that precise form beyond the limitations which may be imposed by the following claims.

We claim:
1. A fluid driven turbine comprising a housing; an annular tube carried within the housing and having therein two annular, separated passageways extending therearound; a rotor rotatably carried in said housing and having a peripheral tubular portion receiving said tube therewithin; said rotor portion having a slot therethrough; support means interconnecting said tube and said housing retaining the tube in fixed position and extending through said slot; a plurality of blades carried by and within said rotor portion extending circumferentially therearound and transversely thereacross and terminating by spaced apart exhaust ends in close proximity with said opposite sides of said tube support means providing openings from between said blade ends and said support means for exhaust flow from said rotor portion into said housing; said blades having edges in approximate running fit about the exterior surface of said tube; one of said tube passageways having a plurality of jets leading therefrom and directed toward blades in zones centrally of their lengths between their said ends, the direction of said jets being that which will cause fluid leaving the jets to impinge on common sides of said blades to flow laterally between adjacent blades in opposite directions from said zone around said tube and out said opening between the blade ends, to turn the rotor in one direction; the other of said tube passageways having a plurality of jets leading therefrom directing fluid from that other passageway against said blades on sides thereof opposite to those said impinged sides; and means selectively supplying fluid to said passageways.

2. The structure of claim 1 in which said jets of said other passageway discharge fluid between said blades intermediate said central zones and said blade ends.

3. The structure of claim 1 in which said tube defines a complete circle and said fluid supply means comprises separate passageways through said support means, one of which passageways communicates with one of said tube passageways and the other communicates with the other tube passageway.

References Cited in the file of this patent

UNITED STATES PATENTS

| | | |
|---|---|---|
| 790,405 | Stumpf | May 23, 1905 |
| 841,486 | Dake | Jan. 15, 1907 |

FOREIGN PATENTS

| | | |
|---|---|---|
| 14,519 | Great Britain | 1897 |